June 18, 1929. S. L. MOORE, JR 1,717,996
MEANS FOR AND METHOD OF MAKING INSULATORS
Filed July 22, 1924
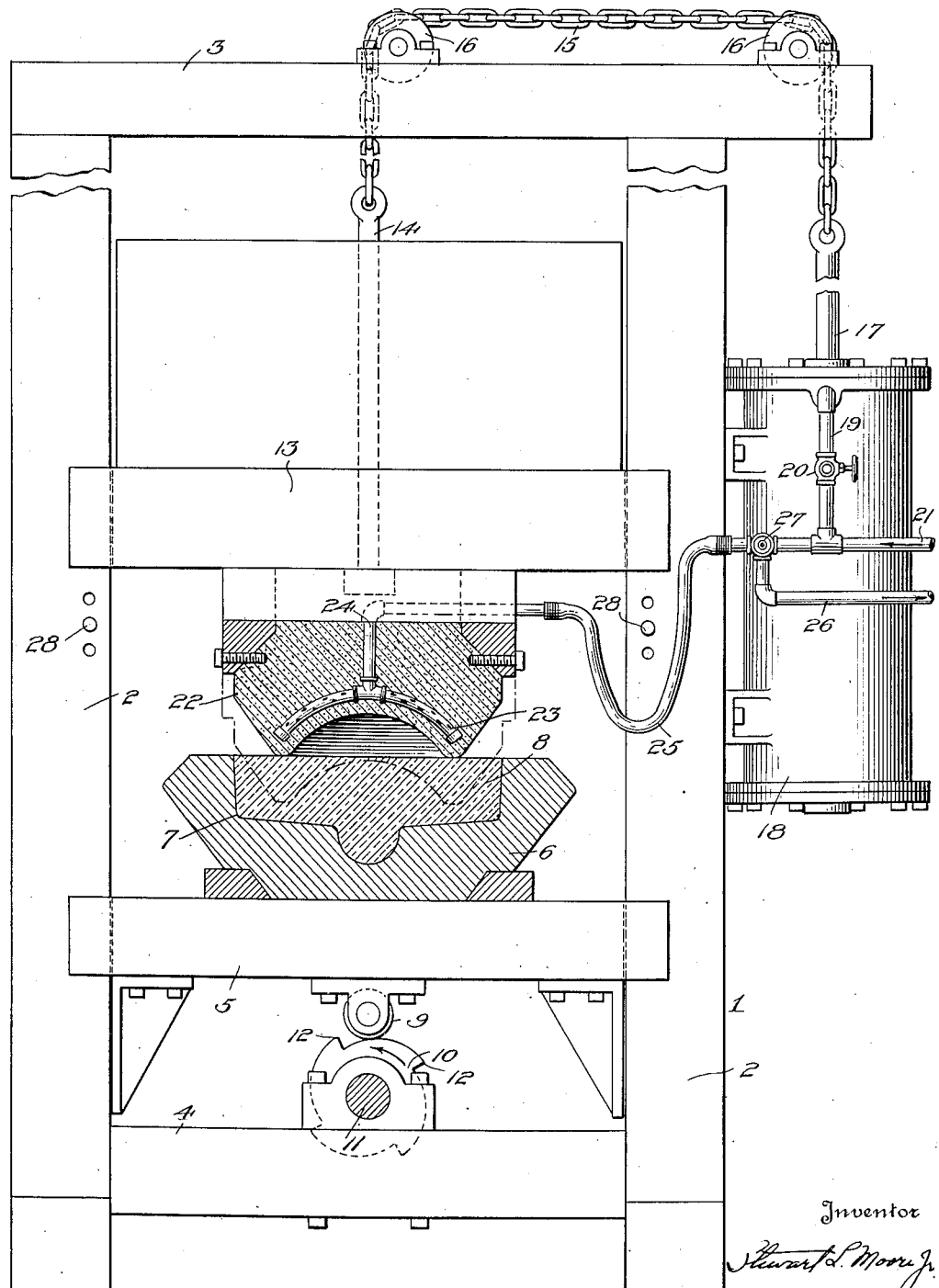

Patented June 18, 1929.

1,717,996

UNITED STATES PATENT OFFICE.

STEWART L. MOORE, JR., OF VICTOR, NEW YORK, ASSIGNOR TO LOCKE INSULATOR CORPORATION, OF BALTIMORE, MARYLAND, A CORPORATION OF MARYLAND.

MEANS FOR AND METHOD OF MAKING INSULATORS.

Application filed July 22, 1924. Serial No. 727,540.

The invention relates to means for and a method of molding or forming insulators.

The primary object of the invention, generally stated, is the provision of means for and a method of vibrating a mass of plastic porcelain clay or the like while it is subjected to the action of mold elements whereby the objectionable stratification generally present in the material will be eliminated.

As the result of extensive experimentation, I have discovered that by rapidly vibrating the plastic clay the internal stresses are relieved and the texture improved owing to the closing of the laminations. It is a matter of common knowledge that when the clay leaves the pug mill it is not usually of uniform density and may be more or less laminated or stratified. The variations in the density cause internal strains which frequently render an insulator formed from such clay defective and liable to fracture. As the defects are not visible on the surface the faulty condition may not be detected until after the insulators have been put in service and the necessary replacement of those which crack or break is a troublesome and expensive matter.

It is with the above facts in view that I have designed the present apparatus and developed the method of subjecting the clay to rapid vibrations of low amplitude during the act of compressing the clay by means of molds or dies.

Another object of the invention, more particularly stated, is the provision of a novel means for and method of withdrawing the air from between the mold and the clay during the pressing operation and subsequently forcing air between the formed insulator and the mold for breaking the vacuum which forms or which tends to form when the upper mold member is withdrawn from the molded piece.

To the attainment of the foregoing and other objects and advantages, the invention consists in the details of arrangement and construction, together with the steps of the method used in connection with the apparatus to be hereinafter more fully described and claimed, and illustrated in the accompanying drawing, it being, however, understood that the disclosure is merely an exemplification of the principle involved and that the right is reserved to make all such changes and modifications as will widen the field of utility, provided such variations constitute no departure from the spirit of the invention or the scope of the claims hereunto appended.

In the drawing:

The figure is an elevation of a device or machine for carrying out the invention, the mold or die members being shown in section.

Referring to the drawing in detail, the numeral 1 designates, broadly, a supporting structure or frame which might in actual practice consist of spaced upright guides 2 connected at their upper and lower portions by transverse elements 3 and 4. Mounted for vertical movement along and within this supporting structure or guide is a table or platform 5 upon which is mounted the lower mold member 6 which is necessarily formed with a cavity 7 for receiving the plastic material, such as porcelain clay, indicated at 8.

It is intended that this table 5 be vibrated at a high frequency but with low amplitude. It is conceivable that various devices might be provided for carrying out this feature though for the sake of illustration I have represented the table as equipped on its underside with a suitably mounted roller 9 bearing upon the periphery of a cam 10 journally supported by a shaft 11 on the lower transverse element 4. This cam is shown as having its periphery formed with a plurality of teeth 12 and it is obvious that the number of teeth may be made as great or as little as preferred and that the length of the teeth may likewise be varied, depending upon the contemplated rapidity of the vibratory movement to be imparted to the table. No specific means is illustrated for rotating the cam as it is apparent that any well known drive may be employed.

While I have indicated mechanical means for causing a vibration or reciprocatory movement of the table, it will be obvious to those skilled in the art that these movements can be obtained by an air hammer or analogous devices and the essential element of this portion of the invention is merely to cause the table to have a reciprocatory movement at sufficiently rapid intervals so as to eliminate the stratifications and to produce an insulator of uniform density, and any means for producing such movement of the table in combination with the other elements of the machine, or their equivalent, is considered to be within the scope of my invention.

Movably mounted within the supporting and guiding frame structure is a species of cross-head 13 which in actual practice is of considerable weight. Carried by this cross-head is an eye bolt 14 or the like with which is connected one end of a chain or other flexible member 15 trained over guide pulleys 16 and connected with a piston rod 17 operating within a cylinder 18 suitably mounted on the frame 1. The details of the interior mechanism of the cylinder are not shown as this type of device is well known. Suffice it to say that the rod 17 extends from a piston which is adapted to be moved downwardly by admitting compressed air into the cylinder at the top thereof through a pipe 19 equipped with a suitable control valve 20 and connected with a compressed air supply pipe 21 leading from a source of pressure. This device is provided for the purpose of raising the cross-head, lowering thereof being accomplished by gravity.

Detachably supported or mounted beneath the cross-head is the upper mold member 22 which is formed of porous material and which has its lower surface of proper shape, depending upon the nature of the insulator to be formed, this mold member 22 being adapted to engage the plastic material 8 and give it the proper shape. Embedded or otherwise mounted within the mold member 22 is a perforated pipe 23 with which is connected a pipe 24 having connected therewith a hose or flexible conduit 25. This hose connects with the pipe 21 so that compressed air may be admitted to the pipe 23. Connected with the pipe 21 is a suction pipe 26 and at the juncture of the two is a control valve 27 which is operable to permit the application of either suction or pressure, as the case may be.

In the operation, the plastic porcelain or other clay is placed within the mold cavity 7 and the cross-head 13 is permitted to descend upon it while the shaft 11 is driven to produce the vibratory movement of the table so that any laminations or stratifications in the clay will be eliminated and the mass rendered homogeneous. When the upper mold 22 engages the plastic material there is a tendency to compress the air within the active face of the mold and to avoid this the valve 27 is manipulated so that suction will be produced through the hose 25, pipe 24, and pipe 23. As the mold is of a porous nature, the imprisoned air will be drawn out. The upper mold member descends until the cross-head engages suitable stops 28 provided at some convenient point or points.

After the upper mold member has reached the downward limit of its movement, the valve 20 is opened to permit compressed air to enter the cylinder through the pipe 19 and force the piston downwardly. The resultant pull on the chain or other flexible member causes the cross-head and upper mold member to be lifted to normal or initial position. When the upper mold member starts to draw away from the molded piece there is a tendency to form a vacuum which must be broken to avoid injury to the molded piece or insulator. The valve 27 may then be opened and compressed air permitted to flow to the perforated pipe 23 and this air, passing through the pores of the upper mold member, will relieve the suction effect and prevent a vacuum forming without it being necessary to utilize any of the vents or valve devices commonly used under similar circumstances.

A machine constructed in accordance with the invention will produce insulators of uniform density free from the objections incident to laminations or strata of slightly different characters. It will also be observed that the action will result in an even distribution of the moisture throughout the plastic mass so that subsequent drying will be more uniform.

I claim:

1. In a machine of the character described, relatively movable mold members adapted to compressingly engage and shape plastic material, and means for applying air pressure through one of the mold members upon the plastic material.

2. In a machine of the character described, a mold containing plastic material, means for applying pressure to the plastic material, and means for selectively applying suction or compressed air to said plastic material.

3. In a machine of the character described, a mold containing plastic material, means for applying mechanical pressure to the plastic material, means for vibrating the mold simultaneously with the application of pressure, and means embedded within the body of the mold for permitting withdrawal of fluid from the plastic material.

4. In a machine of the character described, a mold containing plastic material, means for selectively applying suction or compressed air to said plastic material, and means for vibrating the mold and applying pressure to the plastic material therein.

5. In a molding machine, a mold containing plastic material, a second mold member of porous material, a perforated pipe located within the second named mold member, and means for selectively applying suction or pressure to said pipe.

6. In a molding machine, a mold containing plastic material, a perforated pipe located within the mold, means for selectively applying suction or pressure to said pipe, and means for vibrating the mold.

7. In a molding apparatus, a mold member adapted to be brought into compressing engagement with plastic material to be molded, said mold member being of a porous nature, and means for selectively producing pressure or suction through said mold member.

8. In a molding apparatus, a mold member adapted to be brought into compressing engagement with plastic material to be molded, said mold member being of a porous nature, means for selectively applying suction or pressure through said porous mold member, and means for vibrating the plastic material.

9. In an insulator forming machine, a lower mold member containing plastic material, means for vibrating said molding member, a second mold member and means for moving the same into engagement with the plastic material, said second mold member being porous and provided with a perforated pipe embedded therein, and means for selectively applying suction or pressure to said pipe for withdrawing or supplying fluid from or to the adjacent surface of the plastic material.

10. The method of forming insulators comprising interposing between mold members suitably formed, a mass of plastic clay, vibrating said members while pressing the same together, simultaneously applying suction to said clay through one of said members, and subsequently applying pneumatic pressure through said member to facilitate removal of the formed clay from the mold members.

In testimony whereof I affix my signature.

STEWART L. MOORE, Jr.